United States Patent
Taylor

(10) Patent No.: US 7,421,113 B2
(45) Date of Patent: Sep. 2, 2008

(54) SYSTEM AND METHOD FOR LOCALIZING IMAGING DEVICES

(75) Inventor: Camillo J. Taylor, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 613 days.

(21) Appl. No.: 11/093,748

(22) Filed: Mar. 30, 2005

(65) Prior Publication Data

US 2006/0227999 A1 Oct. 12, 2006

(51) Int. Cl.
*G06K 9/00* (2006.01)
*G06T 15/00* (2006.01)
*G06K 9/20* (2006.01)

(52) U.S. Cl. .................. 382/154; 382/100; 345/419

(58) Field of Classification Search ............... 382/100, 382/103, 106, 154, 286, 312, 318; 348/42, 348/46, 47, 135, 139; 345/418, 419, 420, 345/584, 587, 619, 664, 473
See application file for complete search history.

(56) References Cited

U.S. PATENT DOCUMENTS

| | | | |
|---|---|---|---|
| 6,614,429 B1 * | 9/2003 | Zhang et al. | 345/420 |
| 6,661,913 B1 * | 12/2003 | Zhang et al. | 382/154 |
| 2003/0001825 A1 | 1/2003 | Omura et al. | |
| 2004/0067714 A1 | 4/2004 | Fong | |
| 2004/0103101 A1 | 5/2004 | Stubler | |
| 2004/0227820 A1 | 11/2004 | Nister | |

FOREIGN PATENT DOCUMENTS

WO 0213140 A2 2/2002

OTHER PUBLICATIONS

Yu et al, "Dynamic calibration of stereo photogrammetric system based on optical reference bar." Proceedings of the SPIE—The International Society of Optical Engineering. Conference Proc. SPIE—Int. Soc. Opt. Eng. (USA). vol. 4921, Oct. 17-18, 2002, pp. 104-114.
Laveau, et al., "3-D Scence Representation as a Collection of Images and Fundamental Matrices", Institut National De Recherche En Informatique Et Automatique, No. 2205 (1994).
Zhang, "Determining the Epipolar Geometry and its Uncertainty: A Review", International Journal of Computer Vision, 27(2), 161-198 (1998).

* cited by examiner

*Primary Examiner*—Yon J. Couso
(74) *Attorney, Agent, or Firm*—Synnestvedt & Lechner LLP

(57) ABSTRACT

A system and method for localizing imaging devices in a network using images taken by the imaging devices. The relative position and orientation of a network of camera-equipped communications devices are obtained by having each device examine images taken by its camera. The devices are also equipped with controllable light sources that vary their output in a predetermined manner. This variation is found in images and used to identify the devices in view and to define epipolar points related to the other imaging devices in view. Common reference points in the image are also identified. The imaging devices then exchange details of the epipolar and common reference points with each other, and use them to obtain their relative position and orientation.

26 Claims, 4 Drawing Sheets

SYSTEM AND METHOD FOR LOCALIZING IMAGING DEVICES

FIELD OF THE INVENTION

The present invention relates to systems and methods for localizing nodes in a network, and more particularly to identifying and localizing nodes in a network of imaging devices using images taken by the imaging devices.

BACKGROUND OF THE INVENTION

Many communications devices are becoming equipped with low-cost image acquisition capability. For instance, many cell phones now incorporate digital cameras, and many pocket personal computers (PPCs), and personal digital assistants (PDAs) have image acquisition and communications options. As such devices proliferate, a number of applications become possible in which such devices are networked to provide a distributed imaging capability.

For instance, a group of cameras equipped with wireless communications capability can be placed on the walls in and around a building, then networked together to form a surveillance system covering the exterior and interior of the building. Such a rapidly deployable surveillance system may be used, for instance, by military personnel securing a target, or by an emergency response team responding to an incident such as a fire or an accident.

In another application, a network of communications-enabled cameras distributed around a sporting event may provide an imaging network capable of capturing the motion and positions of players in three dimensions. This information may be useful for transmission of the game over the internet or for post-game analysis of player performance.

Such a network of communications-enabled cameras could also be used to survey the locations of other sensor nodes in the scene such as temperature sensors, accelerometers or acoustic sensors. These location estimates could be used to better analyze and interpret the measurements derived from these sensors. Such a capability could be used in building monitoring applications where the sensor information could be used for energy management, airflow management, or intrusion detection.

A common feature of all such distributed imaging network applications is the need for each image acquisition node to be localized, that is, the need to know the position and orientation of each image acquisition node with respect to the other nodes.

Many prior art localization methods have used radio or acoustic signals, and monitored the time of flight, or the relative strength of the signals as a way of obtaining range information which can be used to recover the relative positions of the nodes in a network. Such techniques do not, however, allow the relative orientation of the imaging devices in the network to be easily calculated.

SUMMARY OF THE INVENTION

Briefly described, the system and method of this invention uses images taken by imaging devices in a network to localize the imaging devices. Moreover, by providing the imaging devices with image analysis capability, the present invention significantly reduces the transmission and storage burden associated with sending entire pictures to a central location for processing.

In a preferred embodiment, the imaging devices in the network each examine the images taken by their own cameras and extract pertinent information. This information is then exchanged with other imaging devices, and used to calculate the relative position and orientation of the nodes in the network.

The imaging devices may also be equipped with controllable light sources, the output of which is varied in a predetermined sequence or pattern. Pixels having a corresponding image-to-image intensity variation may then be found by other imaging devices; and used to identify which imaging devices are visible to them. These pixels may then be used to define the epipolar points related to those imaging devices. Common reference points in the images are also identified. The location of the epipolar points and any common reference points are then exchanged between the imaging devices, and are used to localize the imaging devices and reference points with respect to each other.

These and other features of the invention will be more fully understood by references to the following drawings.

DETAILED DESCRIPTION

In accordance with the method of the invention, imaging devices are provided with sufficient image processing capability that only a relatively small amount of data has to be exchanged in order to localize all the nodes in the network. In particular, the imaging devices are capable of effectively measuring the angles to other network nodes within their view by examining their own images. By then exchanging this data with those nodes, the nodes that can see each other can calculate their relative position and orientation. This localization can then be propagated throughout the entire network.

This method provides a simple and direct way to localize a number of camera-equipped communications devices. The method is fast and provides direct measurements of sensor nodes, including the locations of blind nodes which do not have an imaging capability. In a further embodiment, by having active lights mounted on the camera-equipped communications devices, the images can also be used to identify the network nodes.

These and other advantages of the present invention will now be described in more detail in relation to the attached drawings.

Figure 1:
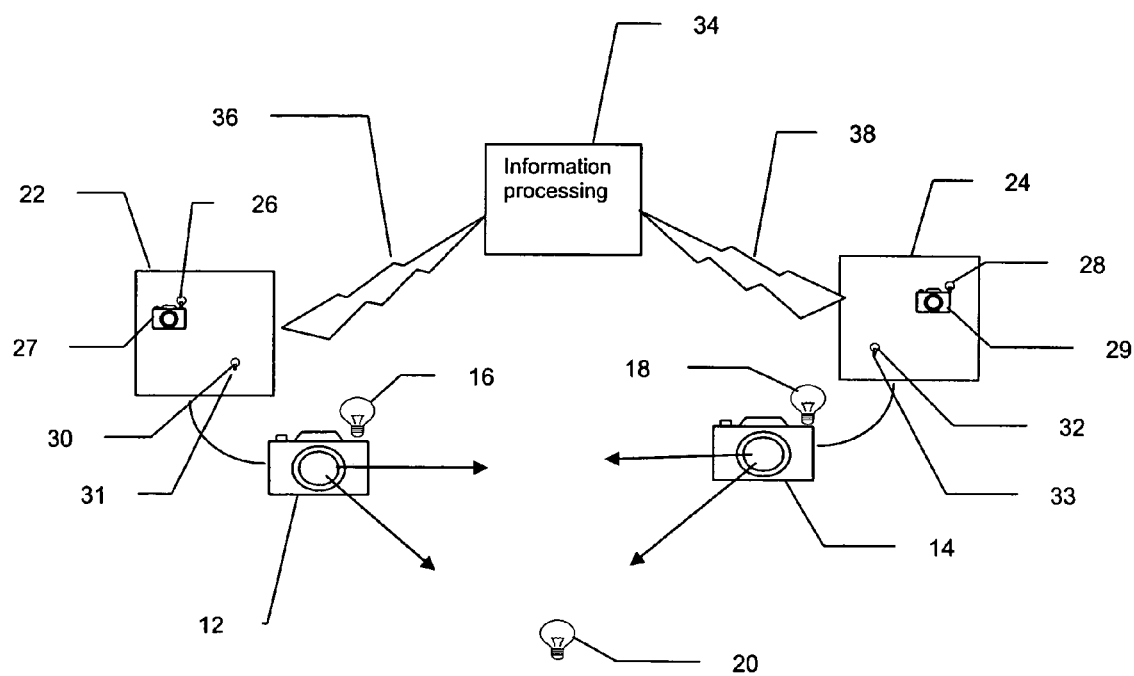
FIG. 1 is a schematic drawing showing the basic elements of one embodiment of the localization system of the present invention.

FIG. 1 is a schematic drawing showing the basic elements of one embodiment of the localization system 10 of the present invention. The system 10 comprises two imaging devices 12 and 14, each fitted with a light emitting device 16 and 18. The imaging device 12 acquires an image 22 that contains a representation 27 of imaging device 14 and a representation 31 of a common reference object 20. Similarly the imaging device 14 acquires an image 24 that contains a representation 29 of imaging device 12 and a representation 33 of the common reference object 20.

Analysis of the acquired images 22 and 24 can then provide the relative orientation and position of the two imaging devices 12 and 14. In a preferred embodiment, this analysis relies on recovering the position in the images 22 and 24 of the epipolar pixels 26 and 28 and of the reference pixels 30 and 32.

Reference pixel 30 is the pixel in the image 22 that most closely corresponds to some property of the common reference object 20 such as, but not limited to, the center of the reference object 20, and may therefore be the central pixel of the representation 31. Similarly, reference pixel 32 may be the central pixel of the representation 33 in image 24.

The epipolar pixel 26 is the pixel that most closely corresponds to the focal point of camera 14 as it appears in the image 22 taken by imaging device 12. In the preferred embodiment of the invention, the epipolar pixel 26 is assumed to be one of the pixels corresponding to the light emitting device 18 of imaging device 14, and is part of the representation 27 of camera 14 in the image 22. Similarly, epipolar pixel 28 is that pixel that most closely corresponds to the focal point of imaging device 12 as it appears in the image 24 taken by imaging device 14, and may be part of representation 29 of imaging device 12 in image 24.

Using the locations of the epipolar pixels 26 and 28 and the reference pixels 30 and 32, expressed as, for instance, angular displacements from a normal to the image plane through a focal point of the imaging device 12 or 14, the information processing unit 34 calculates the localization of the two imaging devices 12 and 14 and the reference object 20, as discussed in detail below.

The imaging devices 12 and 14 forming the distributed imaging network may, for instance, be PDAs equipped with wireless communications capability and digital cameras, wireless phones equipped with digital cameras, or some combination thereof.

The image processing unit 34 may be an independent computer or it may be a suitably programmed micro-processor that is associated with one or other of the imaging devices 12 and 14.

The light emitting devices 16 and 18 may, for instance, be light emitting diodes (LED) or incandescent bulbs or semi-conductor lasers or some combination thereof. The light emitting devices 16 and 18 may vary their output in predetermined sequences that identify their associated imaging device. For instance, the light emitting devices 16 and 18 may blink on and off continuously to repeat a prescribed binary bit sequence at a fixed frequency. By examining a sequence of images 22 and 24, pixels that vary with the same prescribed binary bit sequence and frequency may be found and used to locate the epipolar points 26 and 28, and to identify the associated imaging devices 12 and 14.

The imaging devices 12 and 14 and the light emitting devices 16 and 18 may operate at any suitable frequency of the electromagnetic spectrum, and preferably operate within the ultra-violet to infrared to microwave portions of the electromagnetic spectrum.

Figure 2:
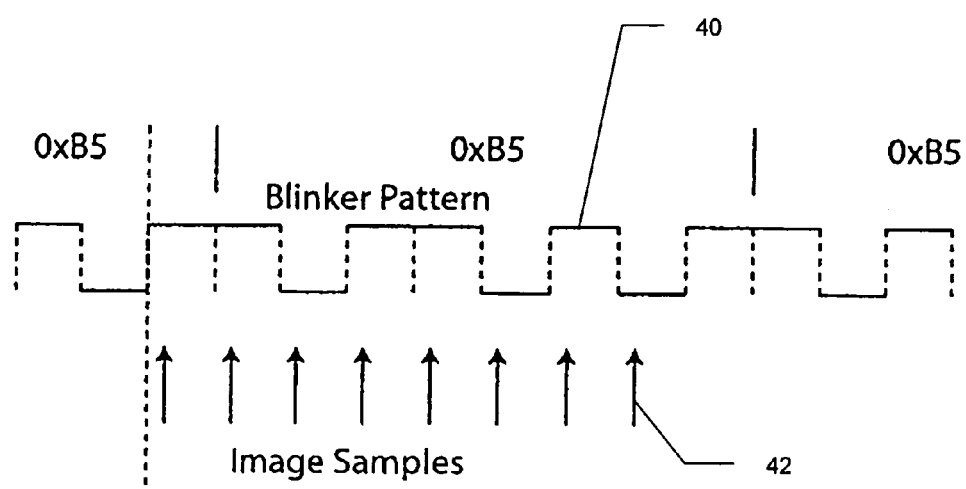
FIG. 2 is a schematic timing graph showing the relative timing of an identification sequence and image acquisition.

FIG. 2 is a schematic timing graph showing the relative timing of an identification sequence and image acquisition. Graph 40 shows the blinker pattern output of a light emitting device 16 or 18 that is varying its output. Images samples 42 show the timing of image acquisition relative to the blinker pattern output.

In a preferred embodiment a programmed micro-controller controls a light emitting diode to produces a binary pattern 40 with a suitable period. The binary pattern 40 may have any number of bits, with the actual number being a trade-off between the number of imaging devices expected to be visible in the same image, and the increased length of the video sequence needed to identify the binary pattern. For instance, a 2 bit binary pattern can only be used to uniquely identify a maximum of two imaging devices, but would only require a sequence of two images. On the other hand, a long bit pattern, such as a 24 bit pattern can be used to uniquely identify thousands of imaging devices, but would require an image sequence of twenty-four consecutive images to be obtained and analyzed. Similarly, a long period pattern would increase the total time to acquire the image sequence. As digital camera shutter speeds are typically in the range of about 1 to about 10 milliseconds, a typical frequency for the binary pattern 40 may be in the range of about 10 to about 100 milliseconds.

In one exemplary embodiment, an eight bit binary pattern 40 was selected with a period of 67 milliseconds. In this exemplary embodiment, the imaging devices 12 and 14 each acquire sequences of eight images at 67 millisecond intervals. In a preferred embodiment, no attempt is made to synchronize the varying output of the light emitting device with the image acquisition. Each pixel in the image sequence may be examined to obtain the maximum and minimum intensities over the course of the image sequence. This may be done on all channels of a red-green-blue (RGB) color image. Alternately, only pixels from one of the channels, such as the green channel, may be examined to obtain a good estimation of the intensity variation of a white object. Once maximum and minimum intensity values have been obtained for each pixel, those pixels having significant variation over the image sequence are analyzed further. In particular, the pixel values are binarized, and the binarized intensity variation examined to see if it matches a pre-defined sequence.

In a preferred embodiment, because the image acquisition and the variation of the light emitting device are unsynchronized, the binarized sequence should be examined for all cyclic permutations of the pre-defined sequence, as the image acquisition may be started at any point in the sequence.

In a preferred embodiment, the system under-samples the signal that is being identified in the sense that images are acquired at the signal frequency, rather than at a minimum of twice the signal frequency, as required by optimal sampling theory. This under-sampling can lead to a failure to detect a sequence when, for instance, the acquisition overlaps with the transitions of the blinker pattern. In a preferred embodiment, the problems associated with under-sampling are overcome by repeating the measurements frequently and relying on the fact that both the camera and the light emitting device have sufficient timing variability, also known as jitter. The method assumes that because of this jitter, on subsequent measurements the image acquisition and blinker pattern transitions will no longer overlap and the pattern will be detected.

Figure 3:
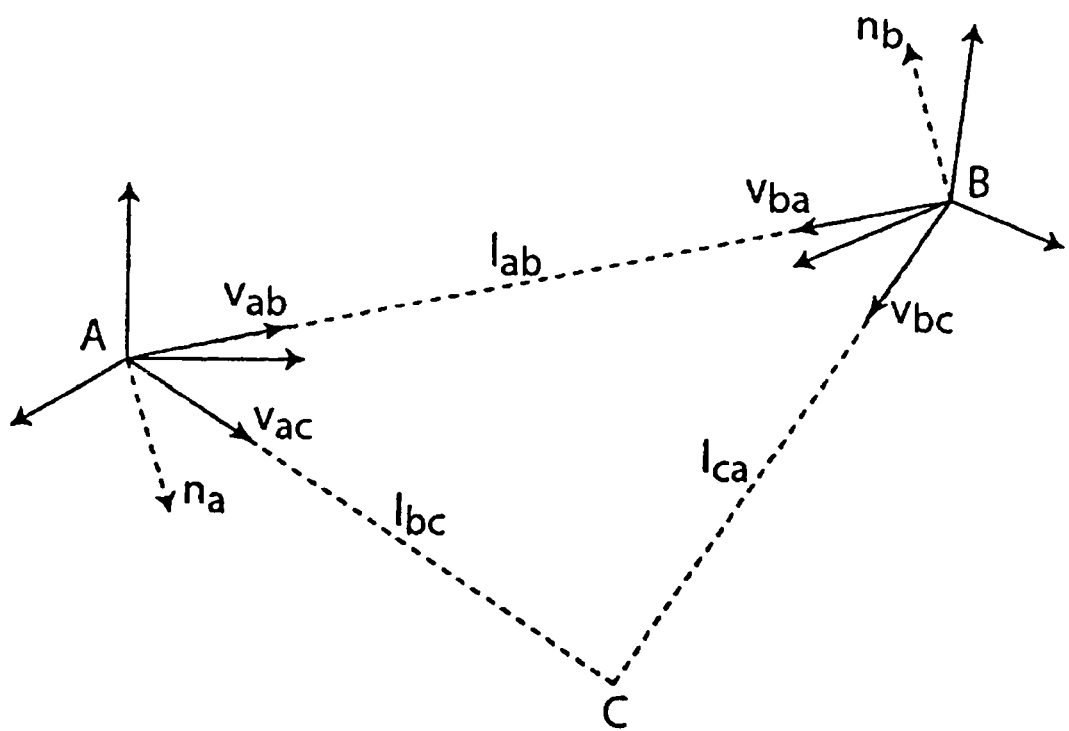
FIG. 3 is a three dimensional graph showing vectors and lengths used in a 3-node localization method of the present invention.

FIG. 3 is a three-dimensional graph showing vectors and lengths used in localizing three nodes by the method of the present invention. The graph of FIG. 3 assumes that focal points of the imaging devices 12 and 14 are located at A and B, and that their cameras have been calibrated in the sense that the focal length is known or has been determined. In FIG. 3, the node C corresponds to the common reference object 20. The locations of the epipolar pixels 26 and 28, and the reference pixels 30 and 32 can then be expressed in terms of unit vectors originating at the focal point of each camera. These vectors can, for instance, be referenced in Cartesian coordinate frames oriented such that their X and Y axes are parallel to the camera image-plane, and their Z axis is perpendicular to the camera image-plane. In effect, the epipolar pixels 26 and 28 and the reference pixels 30 and 32 are defined as angular displacements relative to a normal to an image plane, and through a focal point, of the imaging device.

In such a vector representation, $v_{ab}$ is the unit vector defining the epipolar pixel 26 in the reference frame of imaging device 12, $v_{ba}$ is the unit vector defining the epipolar pixel 28 in the reference frame of imaging device 14, $v_{ac}$ is the unit vector defining the reference point 20 in the reference frame of imaging device 12, and $v_{bc}$ is the unit vector defining the reference point 20 in the frame of imaging device 14.

Because the points A B and C all lie on a plane (the epipolar-plane), the vector cross-products, $n_a = v_{ab} \hat{} v_{ac}$ and $n_b = v_{ba} \hat{} v_{bc}$, both define normals to that plane. Moveover, the normals and the epipolar vectors are related by the same rotational matrix $R_{ab}$ that captures the relative orientation of the imaging devices' frames of reference. In particular:

$$v_{ab} = -R_{ab} v_{ab} \tag{1}$$

$$n_a = -R_{ab} n_b \tag{2}$$

It is also possible to construct the orthonormal matrices:

$$R_a = [v_{ab} n_a (v_{ab} \times n_a)]$$

and $$R_b = [-v_{ba} -n_b (v_{ba} \times n_b)]$$

From equations 1 and 2 and the definition of the orthonormal matrices, it follows that:

$$R_a = R_{ab} R_b \tag{3}$$

which in turn yields the following expression for $R_{ab}$:

$$R_{ab} = R_a (R_b)^T \tag{4}$$

Solving for $R_{ab}$ provides the relative orientation of the two imaging devices 12 and 14 having focal points at nodes A and B. Having found the relative orientation of the two imaging devices, the relative positions of the three nodes A, B and C may be recovered by considering that the vectors form a triangle, i.e., $$l_{ab} v_{ab} + l_{bc} v_{bc} - l_{ca} v_{ca} = 0$$

where $l_{ab}$, $l_{bc}$, and $l_{ca}$ are the lengths of the segments AB, BC and CA. Since the system is homogenous, the configuration of the nodes can only be resolved up to a positive scale factor, i.e., all the angles of the triangle ABC can be determined, but not the absolute size. This is the same scale ambiguity common to all structure from motion reconstructions. In order to resolve this ambiguity, an additional distance measurement is required. One way to resolve the ambiguity is to identify a common object of known size in the images, and use this to provide an absolute distance. Even having an approximately known dimension in one of the images, such as a person of average size, allows an approximate resolution of the scale to be calculated.

In the localization method described above, the nodes are assumed to be at the focal points of the imaging device. In the preferred embodiment, the light emitting devices 16 and 18 are collocated with the imaging device and may not be coincident with the focal point of the imaging device's lens. The localization method is, however, a very good approximation as long as the distances between the nodes is large compared with the separation between the light emitting device and the focal point. In practical applications, the distance between nodes is several meters, while the separation between the light emitting device and the focal point may be only a few millimeters, making this method a very good approximation.

Although the method has been described above by reference to two active nodes and one passive node, one of ordinary skill in the art will appreciate that the method may be extended to any number of active and passive nodes. For instance, one of ordinary skill in the art will readily appreciate that the method described above could be extended to include three or more active cameras. Moreover, all of the imaging devices do not need to be visible to each other. As long as there is an overlap of imaging devices, in the sense that every imaging device in the network is visible to at least one other imaging device in the network, the method described above could be extended to include an arbitrarily large network of imaging devices.

Figure 4:
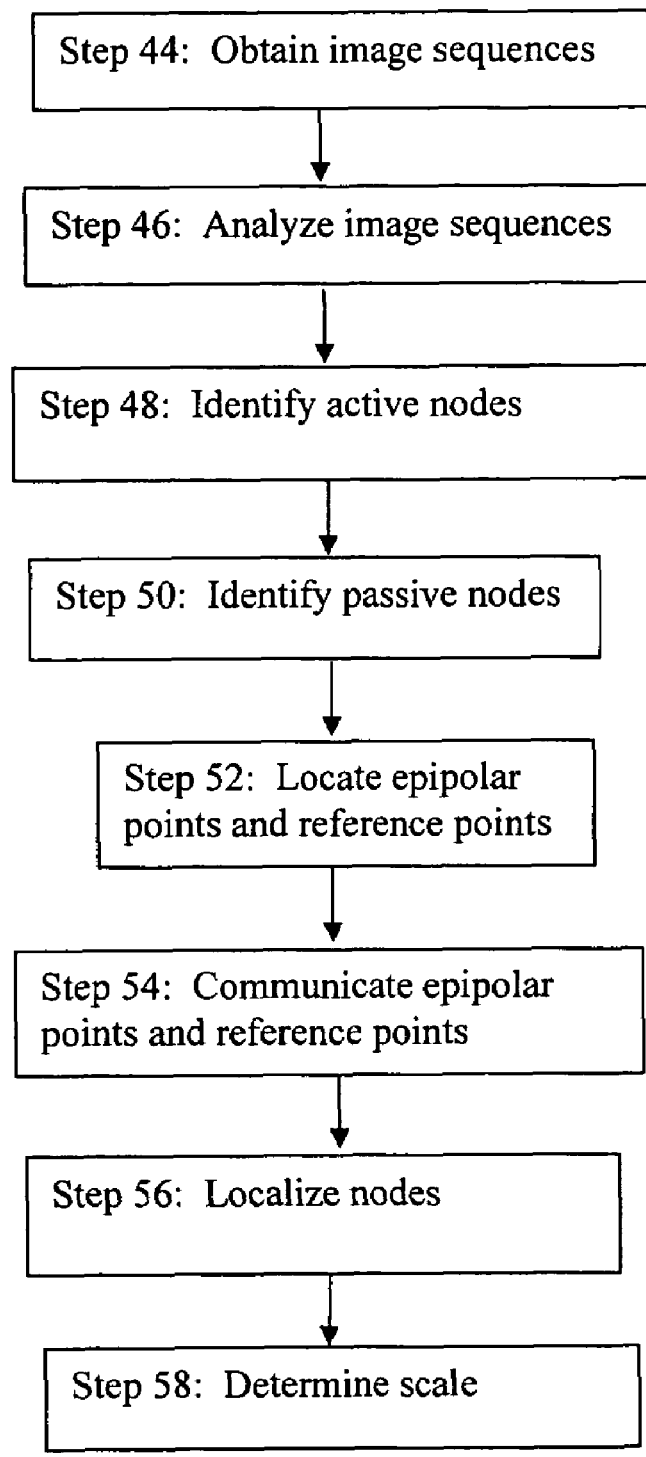
FIG. 4 is a flow diagram showing representative steps of one embodiment of the method of this invention.

FIG. 4 is a flow diagram showing representative steps of the method of this invention.

In step 44, image sequences are obtained by the active nodes, i.e., by the imaging devices in the network.

In step 46 the image sequences obtained by each active node is analyzed. In a preferred embodiment, this analysis is done by software running on processors that are part of the imaging device. In alternate embodiments some or all of the images may be sent to another device for processing such as, but not limited to, another imaging device equipped with more processing capability or to a central location.

In step 48 the active nodes in each of the image sequences are identified by finding the predetermined sequences in which their light emitting devices are being varied.

In step 50 the passive nodes in the image sequences are identified by, for instance, using standard pattern recognition techniques such as, but not limited to, template matching.

In step 52 the pixels associated with the identified active nodes are used to locate epipolar points and the pixels associated with the passive nodes are used to locate reference points.

In step 54 the epipolar points and reference points are communicated. This communication may, for instance, involve all the imaging devices that identify each other exchanging data or it may involve all the data being sent to a subset of those devices or to a single processing point. The communication may be effected by any suitable means including use of the electromagnetic spectrum, either in a wireless form or over suitable connectors such as, but not limited to, conducing wire or fiber optics, or it may be an acoustic channel such as, but not limited to, an ultrasonic or audio acoustic signal, or some combination of these methods. In a preferred embodiment, the communication is via wirelessly transmitted electromagnetic radiation in the megahertz to gigahertz frequency range.

In step 56 the nodes in the network may be localized using the techniques detailed above. This localization may, for instance, be accomplished by processors that are located on or associated with the imaging devices, or it may be done at a remote or central location.

In step 58, the scale of the network is determined by, for instance, identifying an object of a known size in one of the images. This scale may then be propagated through the network.

In further embodiments of the system, a network, capable of the cooperative localization detailed above, may be established in which all the nodes of the network are smart camera modules, i.e., imaging devices associated with communications modules and flashing light emitting devices. Alternatively, a network may be established in which at least two of the nodes are smart camera modules capable of cooperative localization, while one or more other nodes in the network are other active or passive devices such as, but not limited to, relay devices, image processors, beacons, sensor devices or memory devices.

In a further embodiment of the invention, images taken by at least two cooperatively localized imaging devices may be sent to a remote or central location. At such location, the images received from multiple localized imaging devices may be integrated to form at least one composite image presenting a wider field of view as compared with individual images. The composite image may be a two- or three-dimensional image and may, for instance, be used for a variety of purposes including, for example, surveillance, situation assessment, two- or three-dimensional reconstruction and environmental monitoring.

In a further embodiment of the invention, at least one of the imaging devices may have a plurality of image capture surfaces such as, but not limited to, a plurality of charge couple devices (CCDs).

In a yet further embodiment, at least one of the imaging devices may have an optical system that allows for an increased field of view such as, but not limited to, a fisheye lens that allows 180 degree field of view. Two such devices may, for example, be placed back to back to effectively provide a 360 degree field of view.

Some or all of the above-described steps may be implemented using standard and well-known computer programming techniques. The novelty of the above-described embodiment lies not in the specific programming techniques, or programming languages used, but in the use of the steps described to achieve the described results. Software programming code which embodies all or part of the present invention is typically stored in permanent storage of some type, such as permanent storage on an imaging device, or on a storage device associated with a central workstation. In a client/server environment, such software programming code may be stored with storage associated with a server. The software programming code may be embodied on any of a variety of known media for use with a data processing system, such as CMOS memory, flash memory, a diskette, a hard drive, or a CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method of determining a localization of at least two imaging devices, said method comprising:
   providing a first imaging device, substantially collocated with a first light emitting device and operatively linked to an information processing unit;
   providing a second imaging device, substantially collocated with a second light emitting device, and operatively linked to said information processing unit;
   providing a reference point;
   acquiring a first image using said first imaging device, said first image having a first reference pixel corresponding to said reference point and a first epipole pixel corresponding to said light emitting device collocated with said second imaging device;
   acquiring a second image using said second imaging device, said second image having a second reference pixel corresponding to said reference point and a second epipole pixel corresponding to said light emitting device collocated with said first imaging device;
   communicating the locations of said reference pixels and said epipole pixels to said information processing unit; and
   determining said localization using said information processing unit, said reference pixels and said epipole pixels.

2. The method of claim 1 wherein said first and second imaging devices further comprise a communications unit; and wherein said locations of said pixels are provided as angular displacements relative to a normal to an image plane and through a focal point of said imaging devices.

3. The method of claim 1 further comprising the steps of:
   varying the output of said second light emitting device in a predetermined sequence;
   obtaining a plurality of images with said first imaging device;
   identifying at least one pixel in said plurality of images having a variation corresponding to said predetermined sequence, thereby identifying said first epipole pixel.

4. The method of claim 3 wherein said reference point is a third light emitting device.

5. The method of claim 3, wherein the step of varying the output comprises varying the brightness of the light emitted by said second light emitting device.

6. The method of claim 3, wherein said predetermined sequence comprises a binary pattern.

7. The method of claim 6, further comprising the step of varying the output of said first light emitting device in a predetermined sequence; and wherein the output of said light emitting device collocated with said first imaging device is varied according to a first binary pattern and the output of said light emitting device collocated with said second imaging device is varied according to a second binary pattern.

8. The method of claim 7 wherein said second binary pattern is a non-cyclic permutation of said second binary pattern.

9. The method of claim 7 wherein said first and second binary pattern are synchronized with each other.

10. The method of claim 7 wherein said reference point comprises a third light emitting device having an output varied according to a third binary pattern.

11. The method of claim 8 wherein said first and second imaging devices are a first and second digital camera-equipped wireless device, said light emitting device is a visible light Light Emitting Diode and said first and second binary patterns are unsynchronized, eight bit binary patterns.

12. A system for determining a localization of at least two imaging devices, comprising:
   a first imaging means for acquiring a first image, said imaging means being substantially collocated with a first light emitting device and operatively linked to an information processing means;
   a second imaging means for acquiring a second image, said imaging means being substantially collocated with a second light emitting device, and operatively linked to said information processing unit;
   a first image processing means for examining said first image to identify a first reference pixel corresponding to a common reference point and a first epipole pixel corresponding to said light emitting device collocated with said second imaging means;
   a second image processing means for examining said second image to identify a second reference pixel corresponding to said common reference point and a second epipole pixel corresponding to said light emitting device collocated with said first imaging means;

communicating means for communicating the locations of said reference pixels and said epipole pixels to said information processing unit; and localization means on said information processing means for using said reference pixels and said epipole pixels to obtain the relative position and orientation of said first and second imaging means.

13. The system of claim 12 wherein said first and second imaging means further comprise a communications means; and wherein said locations of said pixels are provided as angular displacements relative to a normal to an image plane and through a focal point of said imaging devices.

14. The system of claim 12 wherein the output of said second light emitting means is varied in a predetermined sequence; said first imaging means acquires a plurality of images; and said image processing means identifies at least one pixel in said plurality of images having a variation corresponding to said predetermined sequence, thereby identifying said first epipole pixel.

15. The system of claim 14 wherein said reference point is a third light emitting device.

16. The system of claim 14, wherein the brightness of the light emitted by said second light emitting means is varied in a predetermined sequence.

17. The system of claim 14, wherein said second light emitting means is varied in a binary pattern.

18. The system of claim 17, wherein the output of said first light emitting means is varied in a first binary pattern and the output of said light emitting means collocated with said second imaging means is varied according to a second binary pattern.

19. The system of claim 18 wherein said second binary pattern is a non-cyclic permutation of said second binary pattern.

20. The system of claim 18 wherein said first and second binary pattern are synchronized with each other.

21. The system of claim 18 wherein said reference point comprises a third light emitting means having an output varied according to a third binary pattern.

22. The system of claim 19 wherein said first and second imaging means are a first and second camera equipped wireless device, said light emitting means is a visible light Light Emitting Diode and said first and second binary patterns are unsynchronized, eight bit binary patterns.

23. A computer-readable medium, comprising instructions for:

acquiring a first image using a first imaging device, said first imaging device being substantially collocated with a first light emitting device and operatively linked to an information processing unit;

acquiring a second image using a second imaging device, said second imaging device being substantially collocated with a second light emitting device, and operatively linked to said information processing unit;

identifying in said first image a first reference pixel corresponding to a reference point and a first epipole pixel corresponding to said light emitting device collocated with said second imaging device;

identifying in said second image having a second reference pixel corresponding to said reference point and a second epipole pixel corresponding to said light emitting device collocated with said first imaging device;

communicating the locations of said reference pixels and said epipole pixels to said information processing unit; and determining said localization using said information processing unit, said reference pixels and said epipole pixels.

24. The computer-readable medium of claim 23, further comprising instructions for varying the output of said second light emitting device in a predetermined sequence;

obtaining a plurality of images with said first imaging device;

identifying at least one pixel in said plurality of images having a variation corresponding to said predetermined sequence, thereby identifying said first epipole pixel.

25. A computing device comprising:

a computer-readable medium, comprising instructions for:

acquiring a first image using a first imaging device, said first imaging device being substantially collocated with a first light emitting device and operatively linked to an information processing unit;

acquiring a second image using a second imaging device, said second imaging device being substantially collocated with a second light emitting device, and operatively linked to said information processing unit;

identifying in said first image a first reference pixel corresponding to a reference point and a first epipole pixel corresponding to said light emitting device collocated with said second imaging device;

identifying in said second image having a second reference pixel corresponding to said reference point and a second epipole pixel corresponding to said light emitting device collocated with said first imaging device;

communicating the locations of said reference pixels and said epipole pixels to said information processing unit; and determining said localization using said information processing unit, said reference pixels and said epipole pixels.

26. The computing device of claim 25 further comprising: instructions for:

varying the output of said second light emitting device in a predetermined sequence;

obtaining a plurality of images with said first imaging device;

identifying at least one pixel in said plurality of images having a variation corresponding to said predetermined sequence, thereby identifying said first epipole pixel.

* * * * *